April 18, 1967 W. L. GORE 3,315,020
PROCESS FOR PREPARING BIAXIALLY FIBRILLATED SHEETS
Filed March 21, 1962
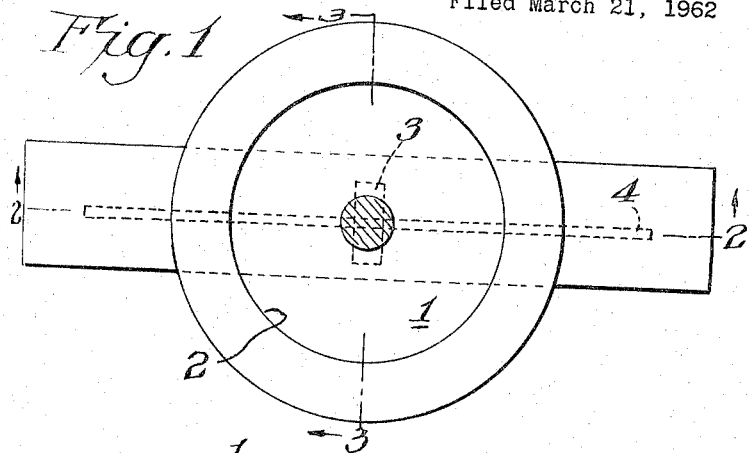
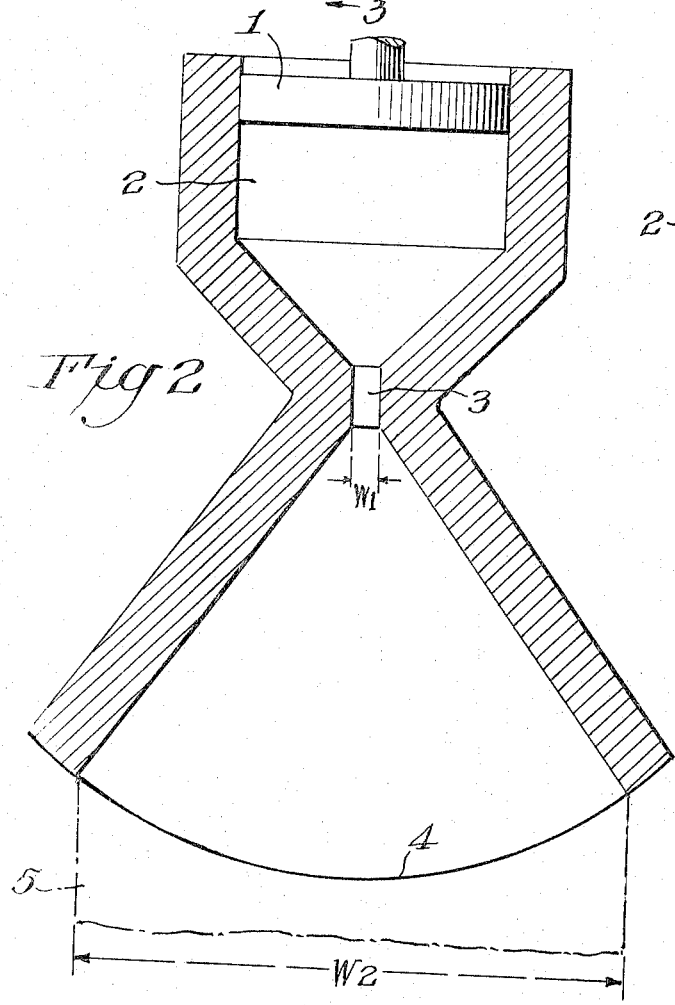
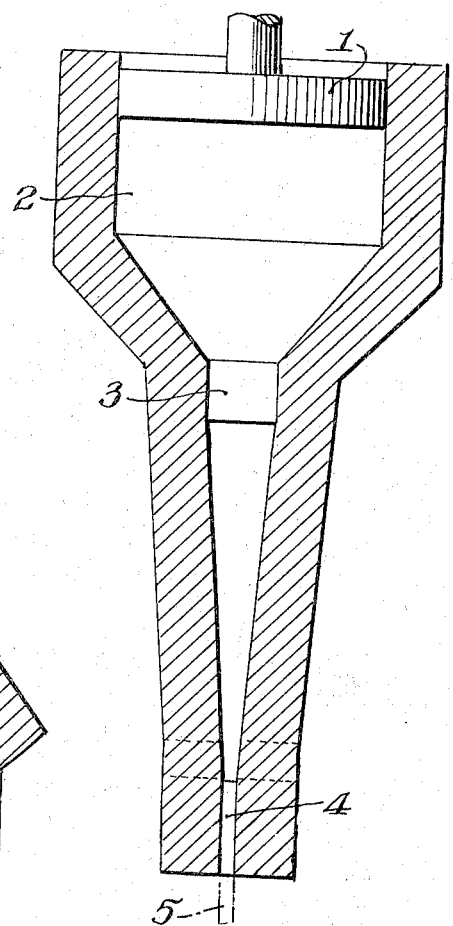
Inventor:
Wilbert L. Gore
By
C. W. Mortenson
Attorney United States Patent Office 3,315,020
Patented Apr. 18, 1967

3,315,020
PROCESS FOR PREPARING BIAXIALLY FIBRILLATED SHEETS
Wilbert L. Gore, Newark, Del., assignor to W. L. Gore & Associates, a corporation of Delaware
Filed Mar. 21, 1962, Ser. No. 181,295
8 Claims. (Cl. 264—120)

This invention relates to a process for preparing sheets, ribbons and the like of fluorocarbon polymers. More particularly, it relates to a process for preparing sheet-like articles of biaxially fibrillated poly(tetrafluoroethylene) which, though in the unsintered state, have high elongation and strength in all directions in the major plane of the sheet. Further, this invention relates to an economical and efficient process for the manufacture of the high-elongation poly(tetrafluoroethylene) sheets in unlimited lengths. This invention also relates to the unique usefulness of the biaxially fibrillated sheets in forming complex shapes.

When poly(tetrafluoroethylene) molding powder is compressed into a sheet without any substantial distortion of the material other than that required to compact it and eliminate voids between particles, the sheet is friable and has essentially zero elongation before it fractures, and it usually crumbles when squeezed between rolls. The toughness of such a sheet is considerably improved when it is heated to 200° C.–300° C. At these temperatures a compressed sheet can be stretched by passing it between rolls so that it becomes thinner and correspondingly longer along the axis in which it was passed through the rolls. When the sheet is cooled to room temperature, it has good toughness and elongation along the axis of rolling, provided the rolling has reduced the thickness of the original sheet to at least one-half with a consequent doubling in length. Although such a roll-stretching treatment greatly improves the elongation of the unsintered sheet along the axis of rolling, the sheet friable across the axis of rolling and can easily be split into long splinters. The well-known techniques for carrying out two-way stretching by tensile stresses using "tenter frames" and the like can not be used with unsintered poly(tetrafluoroethylene) sheet because of the friable nature of the unstretched sheet, even when heated to high temperatures. These prior art methods are not effective in producing the products of this invention because the desired uniformity of particles within the product is not produced. For example, hithertofore it has been impossible to produce a filled sheet of poly(tetrafluoroethylene) which has high elongation and high tensile strength.

Accordingly, an object of this invention is the provision of a process for the production of sheets, ribbons and the like of poly(tetrafluoroethylene) which shaped articles have high strength and high elongation. Another object is the provision of a process for the production of such articles having such properties transversely as well as longitudinally. Still another objective is the provision of methods for making such articles. A still further objective is the provision of filled articles having the said high elongations and strengths and made from unsintered poly(tetrafluoroethylene). These and other objects appear hereinafter.

The objects of this invention are accomplished by converting a portion of the spheroidal particles of the polymer into fibrils and orienting them uniformly in parallel planes. A portion of spherical particles is converted to fibrils which are made to lie uniformly distributed along the longitudinal axis; then another portion of the sphere-like particles is fibrillated and these are made to lie uniformly along the transverse axis. Fillers present are also uniformly distributed and the products are unsintered articles which may be shaped further using conventional molding techniques to form new shapes. Sintering is then done in the new shape or in sheet form.

In the process of this invention, a realtively large cylinder of compressed poly(tetrafluoroethylene) is passed through two orifices in series, first a round, square, or rectangular orifice and second a long slit-shaped orifice. The poly(tetrafluoroethylene) is stretched longitudinally to form a rod when the original cylindrical mass is forced through the first orifice, and the material in the resultant rod is stretched laterally when the rod is flattened by passing it through the second orifice. Prior to the pressing and stretching operations described, the polymer is placed in certain forms so that the desired balanced fibril orientation will attain in the swaging steps.

The preferred starting form of poly(tetrafluoroethylene) for this process is a powder made up of small particles or agglomerates of small particles. These particles may range in size from less than 1 micron in diameter to somewhat over 10 microns. They are roughly spherical in shape and consist of an almost perfectly crystallized group of macro-molecules etxended linearly along the orientation axis of the particles. A discussion of these particles is given in a paper presented at the American Chemical Society meeting of September, 1957 and entitled "Unusual Features in The Crystal Structure of Poly(tetrafluoroethylene)." The said form of poly(tetrafluoroethylene) is known as "dispersion fine powder" and is available commercially from the E. I. du Pont de Nemours & Co., Inc. under the designation "Teflon" 6 and 6C or from Imperial Chemical Industries as "Fluon" CD1.

When the spherical particles are subjected to a sufficient shear stress along the orientation axis of the particle, the molecules slip relative to each other and a long thin fibril is formed. The shear stresses of the first stretching produce fibrils uniformly distributed and aligned mainly along the long axis of the rod. The second stretching produces fibrils uniformly distributed and aligned mainly at right angles to those formed in the first stretching, and also some of the fibrils formed in the first stretching are rotated toward the transverse axis during the second stretching. Not all particles are fibrillated during the stretching, for the shear stress exerted may not be sufficient to cause the molecular slippage, and only a fraction of the particles will by chance be in a position with the molecular orientation axis aligned with the direction the stress is exerted. Further control of fibrillation is obtained by introducing an organic fluid into the original compressed cylinder to serve as a lubricant and reduce the shear stress of particle rubbing against particle.

In the high elongation sheets produced by this process, the organic fluid used as a lubricant may either be left in the sheet to facilitate further forming operations, or it may be removed by evaporation. The dried sheet then consists of undistorted spherical particles and of biaxially oriented fibrils. The toughness and high elongation of the sheets are derived from the intermeshing reinforcement of the fibrils and from the lubricating effects of the matrix of spherical particles, as well as from the uniformity or balance of or in the fibril orientation in any given plane of the orientation in said article.

This invention will be further understood by reference to the figures of which:

FIGURE 1 is a plan view looking down the axis of ram movement;

FIGURE 2, taken on line 2—2 of FIGURE 1, is a cross sectional view showing the relationship of the ram, the cylinder and orifices, and showing an extruded sheet and its width; and FIGURE 3, taken on line 3—3 of FIGURE 1, is a cross-sectional view showing the tapering of the chambers and showing an extruded sheet and its thickness.

Referring to FIGURE 2 a ram 1 is positioned in the cylinder 2 into which is placed a preformed cylinder of compressed poly(tetrafluoroethylene) containing lubricant (such as is described in U.S. 2,586,357). The ram 1 is lowered, forcing the material in the cylinder 2 through the rectangular orifice 3 where it is stretched into a rod, and this is then forced through orifice 4 where it is stretched laterally into a relatively thin ribbon 5.

In order to produce adequate fibrillation along and across the axis in the plane of the sheet, the stretch in each of the orifices must be at least two-fold and will usually be much larger, being generally in the range of 25 to 50-fold. In order to study the flow of material through the device of this invention, colored cubes of material were inserted into a compressed cylinder of uncolored material of the same composition and the cylinder forced successively through the first orifice, examining the distortion of the cubes, and then through the second orifice and again examining the geometry of the distorted cubes. It was found that the cubes had been stretched in the first orifice by an amount equal to the ratio of the cross-sectional area of the orifice divided into the cross-sectional area of the cylinder. It was also found that the strip of material from the colored cube was widened or stretched laterally in progressing from the first orifice through the second by an amount equal to the ratio of the width of the first orifice divided into the width of the second orifice. Referring to FIGURE 1, the longitudinal stretch ratio (Lo.S.R.) in the first orifice 3 is given by the ratio:

$$\text{Lo.S.R., first orifice} = \frac{\text{Cross-sectional area of cylinder 2}}{\text{Cross-sectional area of orifice 3}}$$

Referring to FIGURE 2, the lateral stretch produced in the ribbon in passing from the first orifice 3 through the second orifice 4 is given by the ratio:

Lateral stretch ratio, second orifice $= W_2/W_1$ where $W_2$ is width of the second orifice and $W_1$ is the width of the first orifice.

In using biaxially fibrillated sheeting of unsintered poly(tetrafluoroethylene), it is highly desirable to adjust the orientation balance and amount of fibrillation longitudinally and laterally in the ribbon or sheet. In order to adjust the orientation balance it is necessary to design the first and second orifice to account for the rotation of fibrils during the lateral stretching between the first and second orifices. When the fibrillation orientation is balanced, the stress-strain curves for test pieces cut longitudinally are similar to those cut laterally from the sheet. This balance has been found to be reached when the longitudinal stretch in the first orifice is about 10–70% greater than the lateral stretch in the second orifice, with a range of 25–50% on said differential being preferred.

Thus, the conditions for balanced biaxial fibrillation are:

$$\frac{\text{Width of second orifice}}{\text{Width of first orifice}} \times (1.4 \pm .30) = \frac{\text{Area of cylinder 2}}{\text{Area of orifice 3}}$$

where the areas given are of the cross-sections, or referring to FIGURES 1 and 2

$$\frac{W_2}{W_1} \times (1.4 \pm .30) = \frac{\text{Area of cylinder 2}}{\text{Area of orifice 3}}$$

In addition to the stretch ratio, the lubricant proportion affects the amount of fibrillation. Lubricant proportions in the range from 35–45 volume percent are most commonly used, but quantities of 50 volume percent or higher may be used with very high stretch ratios, and quantities of 20 volume percent or lower with very low stretch ratios. A useful mean is obtained with a lubricant proportion of about 40 volume percent. The volume percent of lubricant is calculated upon the total volume of the mixture, being calculated from the densities of the materials, that of poly(tetrafluoroethylene) being 2.2, "Soltrol," a commercially available hydrocarbon, being 0.78 and so on. Knowing the densities of the polymer, lubricant, filler or given ingredient it is an easy matter for one to determine the volume of lubricant needed to give the desired volume percent of lubricant.

The requirement of the lubricant is only that it be a fluid which will mix with (wet) poly(tetrafluoroethylene). Naphtha gasoline, kerosene, alcohols, glycol and most organic liquids are examples of lubricants. While water containing a wetting agent can be used as the lubricant, the uniformity achieved is not as good as with the organics and accordingly, non-aqueous lubricants are preferred.

The usefulness of the biaxially fibrillated poly(tetrafluoroethylene) sheeting resides primarily in the ease with which it can be shaped and molded and also on the unusually high tensile strength, toughness, and fatigue strength of objects formed from it and when sintered. These unexpected properties stem from the uniform distribution of filler particles and from the biaxial molecular orientation that is derived from the fibrillar orientation in the unsintered form. Although the identity of the fibrils is lost when the crystallites of poly(tetrafluoroethylene) are melted, and the mass of material is homogeneously fused together to form a uniform matrix around any filler particles present, residual domains of molecular orientation remain in the original sites of the fibrils, provided the sintering is properly controlled.

Compression molding of the biaxially fibrillated poly(tetrafluoroethylene) sheet is accomplished most effectively if the organic lubricant is left in the composition. This eases the flow of the compound during the closing of the mold and minimizes the formation of additional fibrils. Current molding operations with granular poly(tetrafluoroethylene) ("Teflon" 1, etc.) are but pressing operations where the voids are compressed so that the particles can be sintered or welded together by heating the molding. However, with the biaxially fibrillated poly(tetrafluoroethylene) sheets of this invention, a high degree of flow can be obtained during the molding so that complex shapes, thin sections and inserts become feasible. After molding the biaxially fibrillated poly(tetrafluoroethylene) into the desired form, the lubricant is removed by evaporation in an oven (or in the open air), and the molded article is heated to 340° C.–380° C. When the unsintered piece is heated above the crystalline melting point of 327° C., the molecules are released from their crystalline bonding and begin to retract from their extended configuration to form random coils. The molecules are released from their crystalline bonding and begin to retract from their extended configuration to form random coils. The molecules in the fibrils encounter melting molecules from adjacent spherical crystals and become entangled with them, delaying their return to completely random configurations. Therefore, it is generally desirable to remove the molded piece from the oven as soon as it is melted and cool it quickly in order to freeze in as much as possible of the molecular orientation present which was obtained in the formation and orientation of the fibrils. This enhances the strength and fatigue properties of the sintered molding. For example, the fatigue endurance life of diaphragms molded from the biaxially fibrillated poly(tetrafluoroethylene) compound is over 10 times greater than that of similar diaphragms molded from granular poly(tetrafluoroethylene). Much of this improvement in fatigue endurance is lost if the molding is kept too long in the molten state, for example, 30–60 minutes for most articles, this time being usually adequate for the molecular orientation to relax to random configurations.

Large proportions of various fillers can be mixed with the poly(tetrafluoroethylene) before forming the biaxially fibrillated ribbon. Many fillers such as mica, graphite, ground fiber glass, powdered bronze, potassium titanate fibers and the like give important improvements in properties such as hardness, rigidity, wear resistance, resistance to plastic flow and heat conductivity. The requirement with fillers is that they be very intimately mixed with the poly(tetrafluoroethylene) before carrying out the stretching operations. This can be accomplished by vigorous agitation of the filler-poly(tetrafluoroethylene) mixture in the presence of a liquid that wets both the poly(tetrafluoroethylene) and the filler. One expedient method is to use the organic lubricant as the mixing fluid, filter off or evaporate off the excess, and then proceed with the fibrillation operation. The objective can also be accomplished by simple tumbling procedures.

Attempts to mold the same compositions before fibrillation have been unsuccessful, for the moldings are weak and they invariably crack and break either during the handling operations or when sintered.

The embodiments of the invention given in the examples below are illustrative only and not limitative.

Example I

An apparatus was constructed as shown in FIGURES 1, 2 and 3 with the following dimensions:

Cylinder diameter=3.0″
Height of first orifice=.75″
Width of first orifice=.25″
Height of second orifice=.050″ (thickness of sheet)
Width of second orifice=6.0″
Cross-section area of cylinder=7.1 sq. in.
Cross-section area of first orifice=.187 sq. in.
Longitudinal stretch in first orifice=7.1/.187=38
Lateral stretch between first and second orifice $$=6.0/.25=24$$

A mixture of poly(tertafluoroethylene) ("Teflon" 6) with 120 cc. of naphtha gasoline per pound of poly(tetrafluoroethylene) (36.7 vol. percent) was compressed into a 3″ diameter cylinder, inserted in the cylinder of the apparatus and forced through the orifices to form a tough, continuous ribbon approximately 6″ wide and .050″ thick. The ram force in this extrusion was approximately 20,000 lbs. or a unit pressure of 3,000 p.s.i. Test specimens were cut lengthwise and crosswise from the ribbon and tensile stress-strain measurements were made quickly before the lubricant evaporated:

Lengthwise test:
    Tensile strength _____p.s.i__ 200
    Elongation at break _____percent__ 800
Sidewise test:
    Tensile strength _____p.s.i__ 180
    Elongation at break _____percent__ 950

Two portions of the above ribbon were heated in an oven at 100° C. to drive off the lubricant and then placed in an oven at 350° C. until they became transparent throughout. One of the pieces was immediately removed from the oven and cooled quickly. The other piece was left in the oven for 45 minutes and then removed and cooled quickly. Test specimens were cut from the two pieces, both along the longitudinal and the lateral directions of the original ribbon. Tensile, elongation, and bend-fatigue tests were made on these test strips.

|  | Short time Sinter | 45-minute Sinter |
|---|---|---|
| Longitudinal tensile strength, p.s.i. | 5,250 | 4,100 |
| Longitudinal percent elongation | 425 | 375 |
| Longitudinal fatigue (bends to failure) | 9,500 | 1,050 |
| Longitudinal stiffness modulus, p.s.i. | 82,000 | 65,000 |
| Lateral tensile strength, p.s.i. | 5,300 | 4,150 |
| Lateral percent elongation | 400 | 400 |
| Lateral fatigue (bends to failure) | 10,700 | 970 |
| Lateral stiffness modulus, p.s.i. | 80,000 | 65,000 |

Example II

A mixture of 3 pounds of poly(tetrafluoroethylene) ("Teflon" 6) with 1 pound 11 ounces of mica powder (30% by volume based on total solids) was placed in a container with 6 quarts of refined kerosene ("Soltrol" 130 obtainable from the Phillips Petroleum Co.). The mixture was agitated vigorously for 3 minutes with a 5″ diameter mixing blade turning at 4000 r.p.m. The excess fluid was removed in a vacuum filter, and the filter cake broken up and dried until the weight of the mixture reached 5 pounds 14 ounces leaving about 20% by weight (40% by volume) of the kerosene in the mixture. This mixture was then processed into a biaxially fibrillated ribbon, using the apparatus and procedure described in Example I. Tensile and elongation tests on this ribbon give the following results:

Lengthwise test:
    Tensile strength _____p.s.i__ 260
    Elongation _____percent__ 750
Sidewise test:
    Tensile strength _____p.s.i__ 280
    Elongation _____percent__ 780

A section of the mica-filled ribbon was dried to remove the lubricant and then sintered at 350° C., total time in the oven being 5 minutes. Properties of the sintered sheet were as follows:

Lengthwise test:
    Tensile strength _____p.s.i__ 4900
    Elongation _____percent__ 260
    Stiffness modulus _____p.s.i__ 425,000
Crosswise test:
    Tensile strength _____p.s.i__ 5100
    Elongation _____percent__ 250
    Stiffness modulus _____p.s.i__ 440,000

The large increase in rigidity without important sacrifice of elongation makes this filled composition of great value in mechanical applications in bearings, seals and support shells where resistance to deflection and plastic deformation are important.

Filler mixtures (30% by volume) using graphite, potassium titanate fibers, ground fiber glass and powdered bronze were also made up by this procedure. In each instance the compositions displayed tensile strengths, good elongations, and increased rigidities similar to those of the above mica composition.

Commercial samples of molded granular "Teflon" sheets containing 30 volume percent mica filler were tested.

Tensile strength _____p.s.i__ 950
Elongation _____percent__ <10
Stiffness modulus _____p.s.i__ 410,000

The lower tensile strength and especially the lower elongation of this material, which is representative of present commercial products, display the great improvement in properties of sintered articles from biaxially fibrillated sheets of this invention.

Example III

A mixture of 5 lbs. of poly(tetrafluoroethylene), 2 lbs. 3 oz. of graphite and 980 cc. of "Soltrol" was tumble mixed together and then pressed into a cylinder having a 3″ diameter. This contained 39.6% by volume of the lubricant. It was then placed in the apparatus of Example I and was extruded by the process of this invention into a tough ribbon that had over 500% elongation both along the length of the ribbon and across the width. A portion of ribbon was dried to remove the lubricant and placed in an oven for 5 minutes at a temperature of 380° C., cooling quickly as described above. Test pieces were cut both along the length of the ribbon and across its width and the following properties measured:

|  | Longitudinal | Lateral |
|---|---|---|
| Tensile, p.s.i. | 4,700 | 4,850 |
| Elongation, percent | 275 | 300 |
| Modulus | 275,000 | 300,000 |

Similar high elongations and rigidity were obtained in articles produced by a similar process using mica, molybdenum disulfide, glass fibers and powder bronze as the filler material.

This example illustrates the effectiveness of this invention, for simple tumble mixing may be used with excellent results.

*Example IV*

A rectangular shell die 1″ wide, 2″ long, and 1″ deep was constructed from porous bronze. A porous bronze ram ⅞″ wide and 1⅞″ long was provided, giving a 1/16″ clearance between the shell and ram. Three layers of the poly(tetrafluoroethylene) sheet from Example I, still containing lubricant, were placed in the bottom of the shell die, forming a layer .150″ thick and covering the bottom of the die. The ram was lowered into the die, forcing the poly(tetrafluorethylene) compound up the walls of the die into the annulus around the ram. The ram was raised and the molding removed. It was a well formed box conforming to the inside shape of the die. The porous bronze allowed any excess lubricant or trapped air to escape during the molding so that no blisters of air or liquid were formed. The molded box was dried in an oven at 100° C. for 5 minutes. The sintered box was still an almost perfect replica of the die. Shrinkage measurements were made on the outside dimensions of the box:

Length 2″→1.85″=7.5%
Width 1″→.95″=5%
Height 1.08″→.94″=13%

Similar moldings were made from the filled biaxially fibrillated ribbons from the above examples. Results were similar except that the shrinkage was about half that with the unfilled biaxially fibrillated composition.

This demonstrates the flow and moldability of the biaxially fibrillated compound and the low shrinkage of shapes during the sintering step.

Attempts were made to form the box from granular poly(tetrafluoroethylene) ("Teflon" 1), but the powder did not have enough flow to fill the box. A mixture of poly(tetrafluoroethylene) dispersion fine powder ("Teflon" 6) containing 38% by volume of naphtha gasoline was placed in the die and pressure exerted by the ram. A well-formed molding was produced but it was so friable that it broke during the drying step. When pieces of the dried molding were sintered, further cracking occurred and very high shrinkage of 50% or more occurred in the walls of the box.

*Example V*

A length of the biaxially fibrillated ribbons from Example I, still containing the naphtha lubricant, was passed through the bight of a pair of rolls, elongating it and reducing its thickness from 0.050″ to 0.005″. Tensile and elongation were measured along the direction of passing through the rolls and across.

|  | Along | Across |
|---|---|---|
| Tensile, p.s.i. | 750 | 150 |
| Elongation, percent | 200 | 1,000 |

The above treatment was effected to increase the amount of fibrillation and orientation of fibrillation in the direction of the rolling without doing so in the other direction in order to produce an unbalanced sheeting for comparison. The above properties show the unbalance.

To test the effect of the unbalance 30 layers of this material were placed in the shell die of Example IV, forming a layer 0.150″ thick and covering the bottom of the die. The 30 rectangular pieces were placed in the die with the long dimension of the rectangle cut along the direction of rolling. The ram was lowered forcing the poly(tetrafluoroethylene) up the walls of the die into the annulus around the ram. The ram was raised and the molding removed. Some separation was noted in the end section of the molding and the end sections were not well filled as were the sides, indicating a resistance to flow of the compound along the direction of rolling.

The molding was dried and sintered. Although the sides of the sintered box were well formed and did not shrink appreciably, the ends distorted and shrank about 25% from their original dimension before sintering, and the separation noted in the unsintered piece increased.

This experiment demonstrates the importance of balance in fibril orientation and of avoiding excessive fibrillation as produced by rolling the ribbon from Example I.

It will be appreciated from the above description and examples that the forming processes of this invention, such as the compression of the powder and the forcing of the compressed mass, which may be cylindrical, rectangular, square or any suitable shape, through a correspondingly shaped chamber 2 and through orifices 3 and 4, are effected at room temperature. While elevated temperatures below the sintering point of the fluorocarbon polymer may be used, there is little or no advantage in operating at elevated temperatures and room temperatures are generally used. At these temperatures flow of the mass results readily under unit pressures of about 2000 to about 4500 p.s.i. The amount of pressure used in a given instance will depend upon a number of factors including the nature and amount of the filler that is present, if any. Usually the filler that is employed will be present in an amount less than 50% by volume based on the combined volume of the polymer and filler. While higher percentages apply, the products desired in this invention are those having the high elongation properties of poly(tetrafluoroethylene). Hence, the amount of filler used is usually less than the 50 volume percent with 30 volume percent being normal. Thus, the products of this invention have improved stiffness, lower plastic flow, among other improved physicals, yet they retain the desirable properties of poly(tetrafluoroethylene).

It will also be appreciated that the sintering is effected to preserve oriented configurations. This is done by sintering in most cases for about 15 minutes or less, excessive times being avoided as explained above.

In any event, fibrils are produced in the process of this invention, and during the sintering or melting of the formed article, the fibrils are transformed into a domain of oriented molecules bound into their oriented configuration by the surrounding matrix of material. Thus shrinkage during sintering is avoided. The new mixture, which can be in the form of sheeting, pellicles, ribbons and the like having biaxially oriented fibers uniformly distributed throughout, can be molded into new shapes by molding techniques well known to the art, and the new objects can be sintered after their formation with only small shrinkages in their dimensions.

The biaxially balanced fibrillation and uniform distribution of the fibrils provides a toughness in the unsintered products of this invention that allows them to be stretched, elongated and formed into complex shapes. The undistorted particles of poly(tetrafluoroethylene) that surround each fibril lock the molecular orientation into place when the mass of material is melted and restrain oriented molecules from retracting which retraction would cause shrinkage and distortion of the formed articles. The biaxial orientation of the fibrils in the heterogeneous mixture of the unsintered articles of this invention is transformed into biaxial orientation of molecules in a molecularly homogeneous mass when the articles are heated above the crystalline melting point of the poly(tetrafluoroethylene) crystals. The biaxial orientation of the molecules improves the strength of these articles. Thus the process and products of this invention are improvements and new inventions beyond those of my Canadian Patent No. 627,000.

While the invention has been disclosed herein in connection with certain embodiments and certain structural details, it is clear that changes, modifications or equivalents can be used by those skilled in the art; accordingly, such changes within the principles of this invention are intended to be included within the scope of the claims below.

I claim:

1. A process for the formation of sheeting from a polymer of tetrafluoroethylene which process comprises mixing pulverulent powder comprising said polymer with about 20% to about 50% by volume, based on the total volume of the resultant mixture, of a fluid lubricant which wets the said polymer forcing the resultant mass from a cylinder through a first constricting orifice to form a rod-like mass, the cross-sectional area of the cylinder divided by the cross-sectional area of the first constricting orifice defining longitudinal stretch ratio; and then forcing the rod-like mass through a second constricting orifice to form a flat ribbon-like mass, the width of the second orifice divided by the width of the first constricting orifice defining lateral stretch ratio; the overall stretching of the mass from the cylinder through the second constricting orifice being such that the ratio of the longitudinal stretch ratio to the lateral stretch ratio is 1.4±0.30.

2. A process in accordance with claim 1 in which said powder contains up to about 50% by volume, based on the total volume of solids in said powder, of a filler uniformly mixed in said powder.

3. A process in accordance with claim 1 in which the longitudinal stretch ratio in the formation of the rod-like mass is at least 2.2 and the lateral stretch ratio in the formation of the ribbon-like mass is at least 2.0.

4. A process for the formation of biaxially fibrillated sheeting of a polymer of tetrafluoroethylene which comprises uniformly mixing a lubricant with said polymer in powdered form to produce a mixture containing from about 20% to about 50% by volume of said lubricant; compressing the resultant mixture in a chamber; longitudinally stretching the resultant compressed mass by forcing it through a constricting orifice to form a rod-like mass and to form fibrils lying parallel to the long axis of the said rod-like mass, the cross-sectional area of said chamber divided by the cross-sectional area of said constricting orifice defining longitudinal stretch ratio; and then laterally stretching the said rod-like mass into a ribbon-like mass by forcing it through a slit orifice to form fibrils lying parallel to the transverse axis of the said ribbon-like mass, the width of the slit orifice divided by the width of said constricting orifice defining lateral stretch ratio and the overall stretching of the mass from the rod-like mass through said slit orifice being such that the ratio of the longitudinal stretch ratio to the lateral stretch ratio is 1.4±0.30.

5. A process in accordance with claim 4 whereby the said ribbon-like mass has longitudinal elongation and tensile strength about equal to its lateral elongation and tensile strength, respectively.

6. A process in accordance with claim 4 in which a filler is uniformly mixed with said powdered polymer of tetrafluoroethylene.

7. A process for the formation of an article from biaxially fibrillated sheeting of a polymer of tetrafluoroethylene which article contains biaxial molecular orientation which process comprises uniformly mixing a lubricant with said polymer in powdered form to produce a mixture containing from about 20% to about 50% by volume of said lubricant; compressing the resultant mixture in a chamber; longitudinally stretching the resultant compressed mass into a rod-like mass by forcing it through a constricting orifice to form fibrils lying parallel to the long axis of the said rod-like mass and in a matrix of non-fibrillated material, the cross-sectional area of said chamber divided by the cross-sectional area of said constricting orifice defining longitudinal stretch ratio; laterally stretching the said rod-like mass into a ribbon-like mass by forcing it through a slit orifice to form fibrils lying parallel to the transverse axis of said ribbon-like mass and in a matrix of non-fibrillated material, the width of the slit orifice divided by the width of said constricting orifice defining lateral stretch ratio and said ribbon-like mass being the said biaxially fibrillated sheeting; and then producing said article by sintering under conditions which fix the molecules in said fibrils in the said matrix, the overall stretching of the mass from the rod-like mass through said slit orifice being such that the ratio of the longitudinal stretch ratio to the lateral stretch ratio is 1.4±0.30.

8. A process for the production of a molded article comprising fibrils of a polymer of tetrafluoroethylene biaxially oriented parallel to a molded surface which process comprises mixing pulverulent powder comprising an unsintered polymer of tetrafluoroethylene with about 20% to about 50% by volume, based on the total volume of the resultant mixture, of a fluid lubricant that wets the said polymer; forcing the resultant mass from a chamber through a first constricting orifice to stretch the mass longitudinally to form a rod-like mass, the cross-sectional area of said chamber divided by the cross-sectional area of said constricting orifice defining longitudinal stretch ratio; forcing this rod-like mass through a second constricting orifice to stretch it laterally to form a flat ribbon-like mass, the width of said second orifice divided by the width of said first orifice defining lateral stretch ratio and the overall stretching of the mass from the rod-like mass from said first orifice through said second orifice being such that the ratio of the longitudinal stretch ratio to the lateral stretch ratio is 1.4±0.30; placing the resultant oriented ribbon-like mass in a mold; applying pressure to the mass to impart to it the shape of the mold; and removing the resultant molded article from said mold.

References Cited by the Examiner

UNITED STATES PATENTS

| | | | |
|---|---|---|---|
| 2,685,707 | 8/1954 | Llewellyn et al. | 18—55 |
| 2,752,637 | 7/1956 | Walker et al. | 264—127 |
| 2,832,713 | 4/1958 | Ragan | 154—46 |
| 2,915,786 | 12/1959 | Haroldson et al. | 18—55 |
| 2,957,791 | 10/1960 | Bechtold | 154—46 |

FOREIGN PATENTS 708,025  4/1954  Great Britain.

ROBERT F. WHITE, Primary Examiner.

EARL M. BERGERT, Examiner.

H. L. GATEWOOD, J. R. HALL, Assistant Examiners.